(12) United States Patent
Pengg

(10) Patent No.: US 7,921,521 B2
(45) Date of Patent: Apr. 12, 2011

(54) DEFLECTION DEVICE FOR AN ANTI-SKID CHAIN

(75) Inventor: Agyd Pengg, Klagenfurt (AT)

(73) Assignee: Pewag Schneeketten GmbH & Co. KG, Graz (AU)

( * ) Notice: Subject to any disclaimer, the term of this patent is extended or adjusted under 35 U.S.C. 154(b) by 803 days.

(21) Appl. No.: 11/745,009

(22) Filed: May 7, 2007

(65) Prior Publication Data

US 2007/0284024 A1    Dec. 13, 2007

(30) Foreign Application Priority Data

May 12, 2006  (AT) .................................. A 827/2006

(51) Int. Cl.
*B60C 27/10* (2006.01)
(52) U.S. Cl. .................... 24/68 CT; 24/116 R
(58) Field of Classification Search ............ 24/116 R, 24/68 CT; 254/372, 358
See application file for complete search history.

(56) References Cited

U.S. PATENT DOCUMENTS

| 4,403,672 | A | * | 9/1983 | Jaulmes | ........................ | 180/205 |
| 6,213,421 | B1 |  | 4/2001 | Franklin et al. |  |  |
| 6,648,260 | B2 | * | 11/2003 | Webber et al. | ............. | 242/379.1 |
| 2003/0102065 | A1 |  | 6/2003 | Picher et al. |  |  |
| 2005/0224623 | A1 | * | 10/2005 | Sumiyashiki | .............. | 242/384.2 |
| 2005/0284978 | A1 | * | 12/2005 | Zolkower | ................... | 242/382.4 |

FOREIGN PATENT DOCUMENTS

| AT | 408 635 B | 1/2002 |
| AT | 006 475 U1 | 11/2003 |
| EP | 0 835 770 A1 | 4/1998 |

* cited by examiner

*Primary Examiner* — Robert J Sandy
*Assistant Examiner* — Michael Lee
(74) *Attorney, Agent, or Firm* — RatnerPrestia

(57) ABSTRACT

A deflection device for an anti skid chain includes a chain wheel rotatably stored in a housing for the accommodation of a chain which can be inserted into the chain wheel, and an actuating element that can be moved between a locking position, in which the movement of the chain wheel is blocked in one direction, and an unlocking position in which said blocking is released, and which engages, via a locking pawl actuated by said actuating element, a toothed ring non-rotatably connected to the chain wheel, which is in the form of an internally-toothed ring of the chain wheel. The locking pawl is pivotally mounted within the interior space surrounded by the toothed ring. The locking pawl engages the toothed ring in the locking position but disengages the same in the unlocking position of the actuating element.

7 Claims, 3 Drawing Sheets

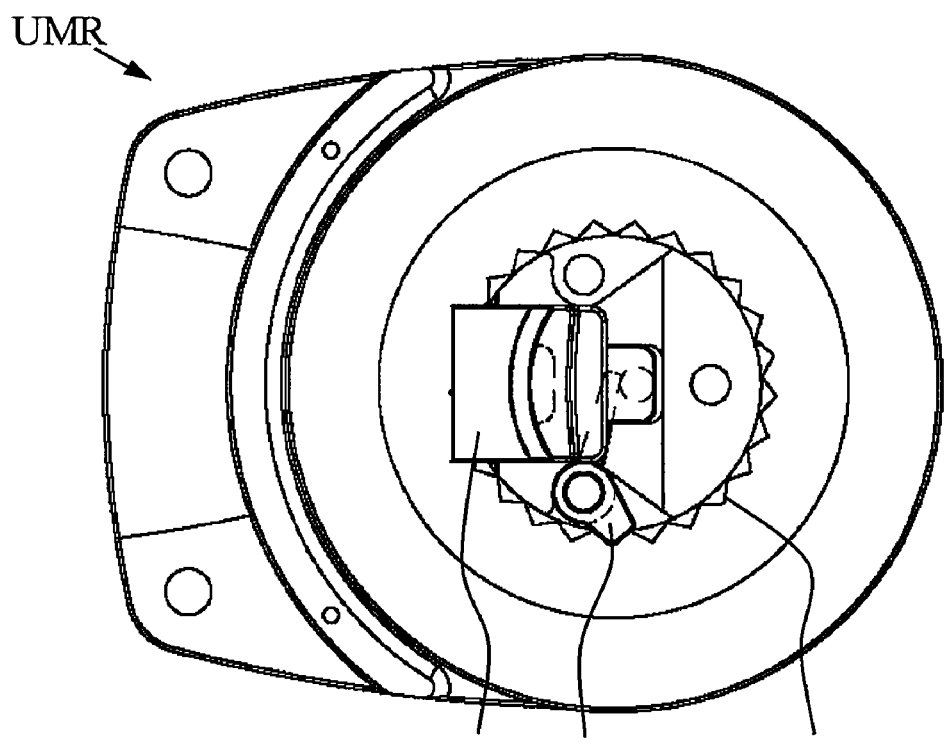
ERK  KLN        ZKR    Fig. 3
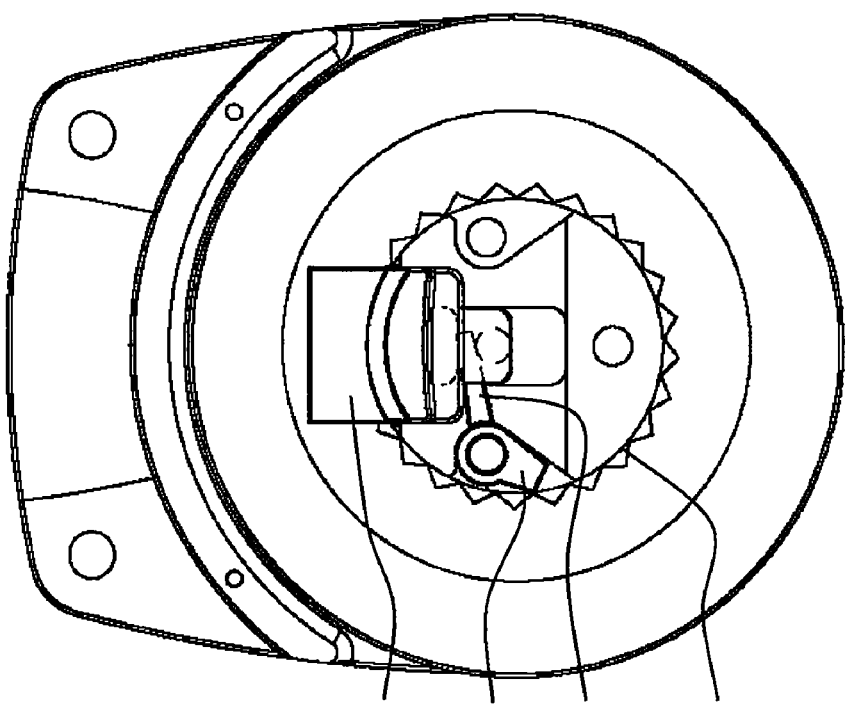
ERK  KLN KLF ZKR   Fig. 4

DEFLECTION DEVICE FOR AN ANTI-SKID CHAIN

FIELD OF THE INVENTION

The invention relates to a deflection device, in particular, a deflection roller for an anti-skid chain. The deflection device comprises a chain wheel, which is mounted for rotation in a housing for the accommodation of a chain which can be inserted into the chain wheel, and an actuating element, which can be moved between a locking position, in which the movement of the chain wheel is blocked in one direction, and an unlocking position, in which said blocking is released, and which engages a toothed ring, which is non-rotatably fixed to the chain wheel, by means of a locking pawl, which is activated by the actuating element.

BACKGROUND OF THE INVENTION

Deflection devices of the type mentioned above are used as tensioning devices in anti-skid chains, in particular, in snow chains, in order to tighten the anti-skid chain when fitted. In order to prevent any undesirable loosening of the tensioning chain, movement (rotation) of the deflection roller contrary to the tightening direction is blocked. However, it should be made possible to release such blocking, if required, for example when the chain is to be removed.

AT 408 635 B describes a method of locking a roller in the context of a tightening device for a rope, which is wound up therein, said tightening device comprising an actuation member having three positions. Two ratchet wheels that are connected to one another in a rotationally fixed manner are each assigned to locking pawls and have blocking directions that are opposed to one another. The actuation member acts on the two locking pawls, the first locking pawl engaging in the ratchet wheel assigned thereto in a first locking position of the actuation member, while the second locking pawl engages the ratchet wheel assigned thereto in the second locking position, so as to release the movement of the ratchet wheel in, or contrary to, the tightening direction and to block any movement in, or contrary to, the opposite direction respectively. The actuation member has a third position, a releasing position that can be placed between the first and the second locking positions, in which neither of the locking pawls engages the ratchet wheels assigned thereto and blocking is canceled. In addition to having the two ratchet wheels, this device is complex and makes high demands on the precision of the design. Furthermore, operation of the device involving three possible positions of the actuation member is complicated.

SUMMARY OF THE INVENTION

The present invention provides an unlockable deflection device with improved reliability of the blocking action but a simple unlocking mechanism, which is important, in particular, when such deflection devices are used in Heavy Goods Vehicle (HGV) tire chains.

This is achieved by a deflection device of the type mentioned at the outset, in which the toothed ring is configured, according to the invention, as an internally-toothed ring of the chain wheel, and the locking pawl is mounted for rotation inside the space surrounded by the toothed ring, which locking pawl engages the toothed ring in the locking position but is disengaged from the toothed ring by the actuating element (directly or indirectly) in the unlocking position.

This solution results in an arrangement which is advantageous with respect to the forces that occur and which is manifested in improved reliability and robustness of the device. Furthermore, the mechanical components of the locking mechanism are better protected due to being enclosed in the space located inside the chain wheel, and the device is on the whole more compact.

In an exemplary embodiment of the invention, the force required for unlocking is reduced further due to the fact that the locking pawl can pivot about an axis which is eccentric with respect to the axis of rotation of the chain wheel.

Furthermore, it is advantageous in terms of operating comfort and accessibility, if the chain wheel is mirror-symmetrical about a plane extending perpendicularly to its axis of rotation and if two actuating elements are provided which lie opposite to one another. It is thus not necessary to ascertain which side is "inside" or "outside" when applying the chain, since the deflection device can be operated from either side.

BRIEF DESCRIPTION OF THE DRAWINGS

The invention, together with its merits and advantageous embodiments, is explained in detail below with reference to a non-restrictive exemplary embodiment of a deflection device shown in the accompanying drawings, in which:

FIG. 3 is an axial view of the deflection roller with the housing partially removed; and FIG. 4 is a view of the deflection roller as shown in FIG. 3, but in the unlocking position;

DETAILED DESCRIPTION OF THE INVENTION

Figure 1:
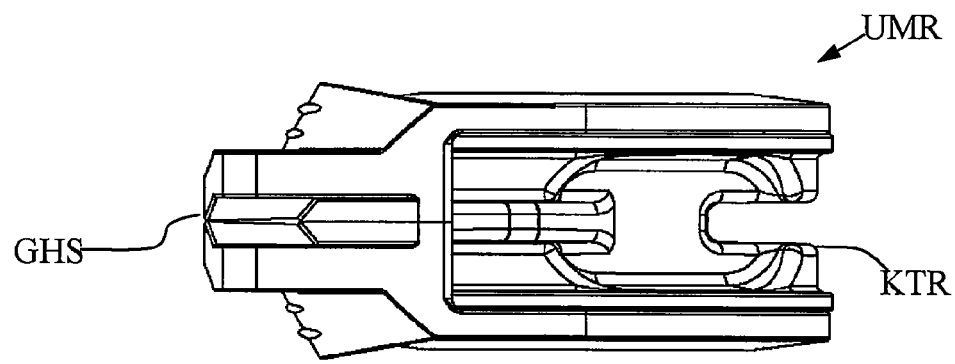
FIG. 1 shows the deflection roller in a view of the pockets of the chain wheel.

As shown in FIG. 1, a deflection roller UMR according to an exemplary embodiment of the invention comprises a chain wheel KTR supported in a housing GHS. In a known manner, the chain wheel KTR comprises pockets for accommodating the individual chain links so that an inserted chain (not shown) can only be moved by the deflection roller UMR together with the chain wheel.

Figure 2:
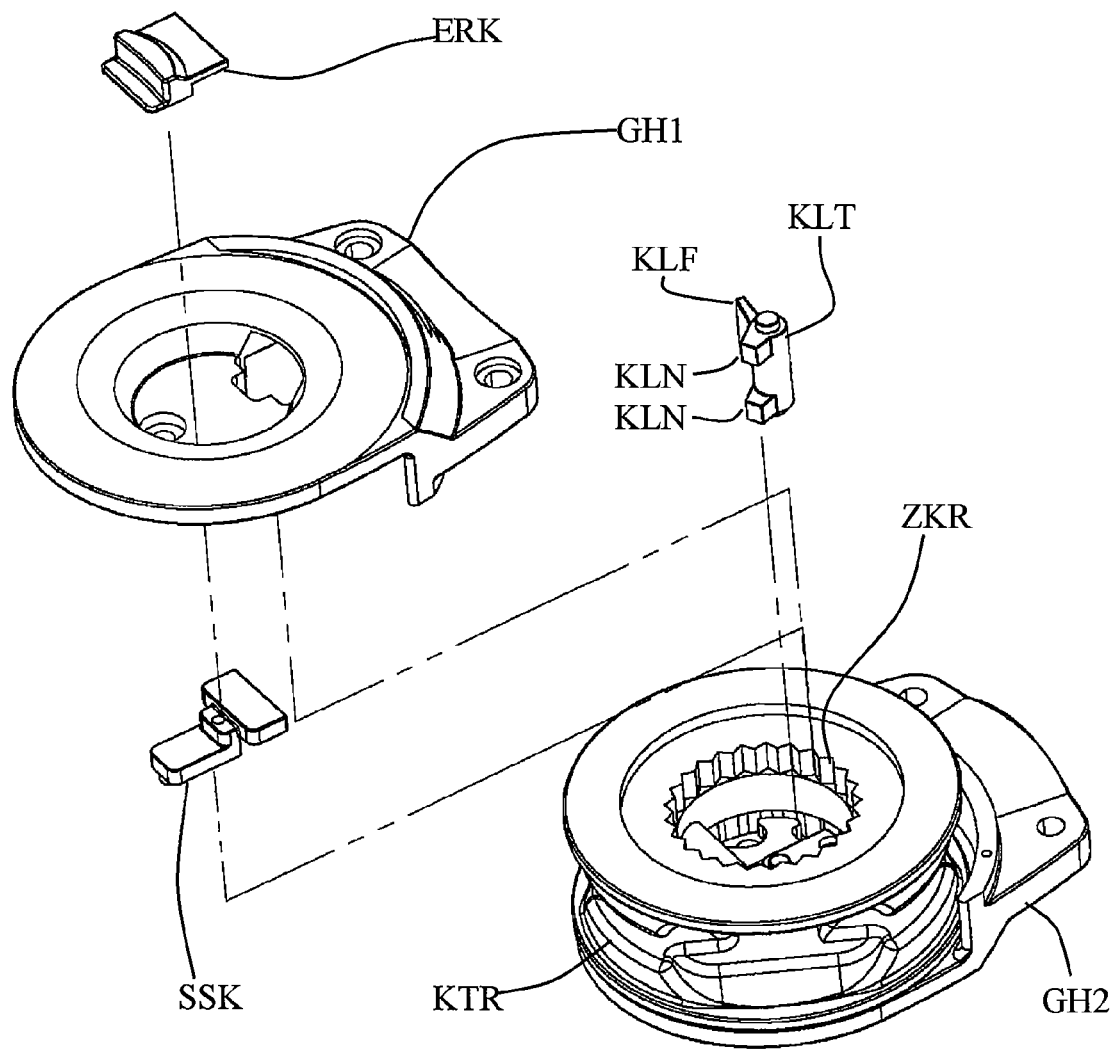
FIG. 2 is an exploded view of the deflection roller.
Figure 5:
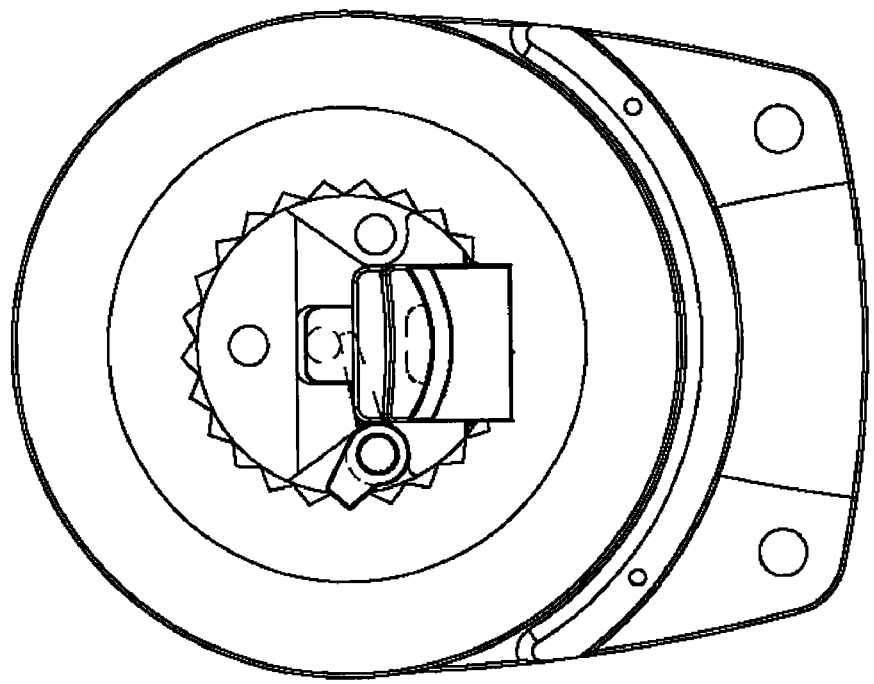
FIG. 5 is an axial view of the opposite side of the deflection roller as shown in FIG. 3 with the housing partially removed.
Figure 6:
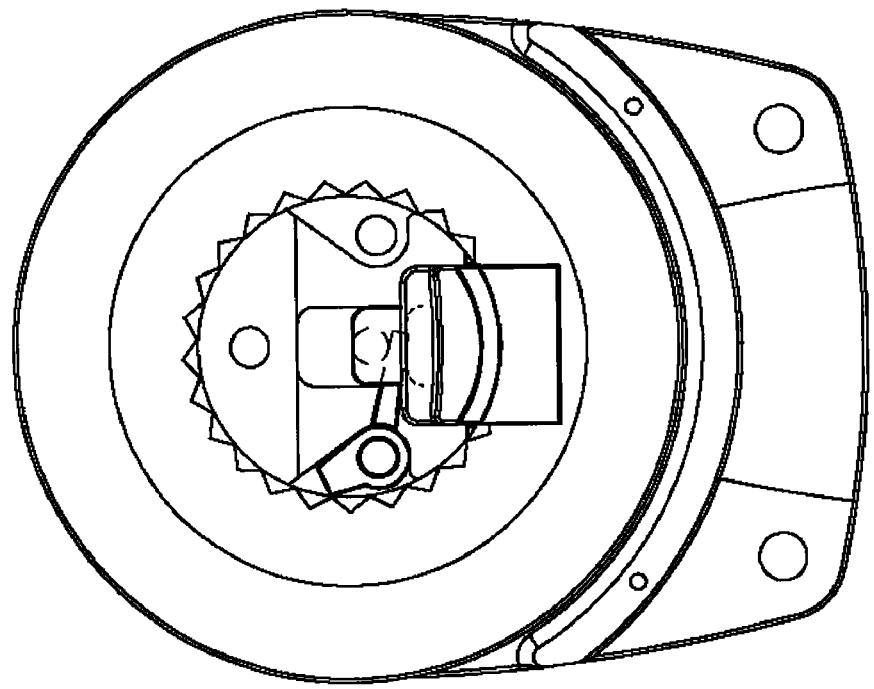
FIG. 6 is a view of the deflection roller as shown in FIG. 5, but in the unlocking position.

As is discernible from FIG. 2, the housing GHS is configured in two parts, for example, and each of the housing halves GH1, GH2 covers a front surface of the chain wheel with a shell-like top surface. The housing halves GH1, GH2 are joined together, e.g. screwed to one another, with the help of lateral fasteners and/or a fastener extending through the axis of rotation of the chain wheel. If required, holding elements may also be provided on the fasteners for attaching another chain strand or rope strand. The inner sides of the top surfaces of the housing halves GH1, GH2 are equipped with annular guides (e.g. annular grooves or annular strips), which, together with corresponding structures on the front surfaces of the chain wheel, serve to enable rotational mounting of the chain wheel KTR.

An interior space capable of accommodating the locking mechanism of the deflection roller extends along the axis of the chain wheel KTR. A toothed ring ZKR is configured in the form of an internally-toothed wheel on the inner side of the chain wheel. The deflection roller in the exemplary embodiment shown is mirror-symmetrical about its mid-plane. In addition to the first toothed ring in the upper third of the internal casing shown in FIG. 2, a second toothed ring is disposed symmetrically, i.e., in the lower third of the internal casing. An unlock button ERK is disposed in an opening in the housing half GH1. The unlock button ERK activates, by means of a slide piece SSK connected rigidly thereto, a pawl KLT and serves as an actuating element for unlocking the chain wheel as described below. An unlock button having a similar action is also provided in the other housing half GH2 in accordance with the symmetrical arrangement. This unlock button acts on the same locking pawl by means of its own slide piece. It could also act on a second locking pawl in a variant of this exemplary embodiment. As indicated above, the pawl KLT, as also the slide piece SSK, is disposed in the interior of the chain wheel, with the ends of the pawl KLT being mounted in depressions in the top surfaces of the housing in such a way that the pawl can pivot about its own axis. The pawl KLT comprises two pawl projections KLN, each of which can engage a toothed ring ZKR of the chain wheel and prevent movement thereof.

FIG. 3 shows the arrangement of the locking pawl in the non-actuated state. The pawl projection KLN engages the toothed ring ZKR and thus prevents movement of the toothed ring in one direction, namely the clockwise direction with reference to the drawing. The pawl projection is pressed against the toothed ring ZKR by means of the force of a spring (not shown). On the other hand, the pawl does not block movement of the toothed ring in the other direction (anti-clockwise direction in the drawing) for which purpose it is merely necessary to overcome the relatively small resistance imposed by the spring force. The pawl projection snaps back into place ("ratchets") in the toothed ring after each tooth.

If the unlock button ERK is activated as shown in FIG. 4 by moving it towards the left, this movement is imparted to the pawl KLT by means of the slide piece SSK. For this purpose, the pawl KLT has a vane KLF, by means of which the slide turns the pawl projection KLN out of the toothed ring in the manner of a lever. The toothed ring can then be rotated freely in either direction and the deflection roller is unlocked. When the unlock button is released, the force of the spring causes the pawl to return to its position shown in FIG. 3 and the pawl and the unlock button ERK are simultaneously pushed back into the non-actuated position.

As mentioned above, the deflection roller of the exemplary embodiment shown is mirror-symmetrical about its mid-plane. It will be obvious to those of skill in the art that the invention can also be realized without this sort of symmetry. It would also be possible, in particular, to provide only one unlock button on one of the top surfaces of the housing.

Although the invention is illustrated and described herein with reference to a specific embodiment, the invention is not intended to be limited to the details shown. Rather, various modifications may be made in the details within the scope and range of equivalents of the claims and without departing from the invention.

What is claimed:

1. A deflection device for an anti-skid chain comprising:
a housing;
a chain wheel rotatably mounted in the housing for the accommodation of a chain which can be inserted into the chain wheel; and
at least one actuating element disposed in an opening in the housing and linearly movable in a radial direction between a locking position, in which the movement of the chain wheel is blocked in one direction, and an unlocking position, in which said blocking is released, said actuating element engaging, via a locking pawl actuated by said at least one actuating element, a toothed ring non-rotatably connected to the chain wheel,
wherein said toothed ring is in the form of an internally-toothed ring of the chain wheel, the locking pawl is pivotally mounted within the interior space surrounded by the toothed ring, and the locking pawl engages the toothed ring in the locking position but disengages the toothed ring when the at least one actuating element is in the unlocking position.

2. The deflection device according to claim 1, wherein said locking pawl is pivotally mounted on an axis which is eccentric relative to an axis of said chain wheel.

3. The deflection device according to claim 1, wherein said chain wheel is mirror-symmetrical about a plane normal to its axis of rotation, and said at least one actuating element comprises two actuating elements that are disposed opposite each other.

4. The deflection device according to claim 2, wherein said chain wheel is mirror-symmetrical about a plane normal to its axis of rotation, and said at least one actuating element comprises two actuating elements that are disposed opposite each other.

5. A deflection device for an anti-skid chain comprising:
a housing;
a chain wheel rotatably mounted in the housing for the accommodation of a chain which can be inserted into the chain wheel; and
at least one actuating element disposed in an opening in the housing and linearly movable in a radial direction between a locking position, in which the movement of the chain wheel is blocked in one direction, and an unlocking position, in which said blocking is released, said at least one actuating element engaging, via a locking pawl actuated by said actuating element, a toothed ring non-rotatably connected to the chain wheel,
wherein said toothed ring is in the form of an internally-toothed ring of the chain wheel, the locking pawl is pivotally mounted within the interior space surrounded by the toothed ring, and the locking pawl engages the toothed ring in the locking position to block movement of said toothed ring in a first direction but permits movement of said toothed ring in a second direction.

6. The deflection device according to claim 1, wherein the at least one actuating element is disposed laterally with respect to the chain wheel.

7. The deflection device according to claim 5, wherein the at least one actuating element is disposed laterally with respect to the chain wheel.

* * * * *